(12) United States Patent
Pauls et al.

(10) Patent No.: US 8,413,720 B2
(45) Date of Patent: *Apr. 9, 2013

(54) ORGANIC ACID COMPOSITIONS AND METHODS OF USE IN SUBTERRANEAN OPERATIONS

(75) Inventors: Richard W. Pauls, Duncan, OK (US); Thomas D. Welton, Duncan, OK (US); David E. McMechan, Duncan, OK (US); Mary Van Domelen, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/485,312

(22) Filed: May 31, 2012

(65) Prior Publication Data

US 2012/0234543 A1    Sep. 20, 2012

Related U.S. Application Data

(62) Division of application No. 11/352,744, filed on Feb. 10, 2006.

(51) Int. Cl.
*E21B 43/26* (2006.01)

(52) U.S. Cl.
USPC ..................... 166/305.1; 166/308.5

(58) Field of Classification Search .................. None
See application file for complete search history.

(56) References Cited

U.S. PATENT DOCUMENTS

| 4,889,887 | A | * | 12/1989 | Fan et al. ..................... 524/510 |
| 5,184,679 | A |   | 2/1993 | Lau |
| 5,392,855 | A |   | 2/1995 | Bernardi, Jr. et al. |
| 6,599,863 | B1 |  | 7/2003 | Palmer et al. |
| 6,605,570 | B2 |  | 8/2003 | Miller et al. |
| 7,205,262 | B2 |  | 4/2007 | Schwartz et al. |
| 7,320,952 | B2 | * | 1/2008 | Chen et al. ..................... 507/240 |
| 2003/0158269 | A1 |  | 8/2003 | Smith et al. |
| 2006/0054324 | A1 |  | 3/2006 | Sullivan et al. |

* cited by examiner

*Primary Examiner* — Angela M DiTrani
(74) *Attorney, Agent, or Firm* — Robert A. Kent; McDermott Will & Emery LLP

(57) ABSTRACT

Methods comprising providing a treatment fluid that comprises using an aqueous base fluid, a synthetic cationic gelling agent, a plurality of particulates, and an organic acid. The treatment fluid is then introduced into at least a portion of a subterranean formation having a temperature of above about 275° F. wherein the particulates are deposited into the subterranean and the treatment fluid form at least one void in the subterranean formation itself. The viscosity of the treatment fluid in the subterranean formation is greater than about 20 cP for at least 20 minutes at temperatures higher than about 275° F.

7 Claims, 2 Drawing Sheets

ORGANIC ACID COMPOSITIONS AND METHODS OF USE IN SUBTERRANEAN OPERATIONS

This application is a divisional of U.S. patent application Ser. No. 11/352,744 by Richard W. Pauls, filed on Feb. 10, 2006, entitled "Organic Acid Compositions and Methods of Use in Subterranean Operations," and published as US 2007/0187096.

BACKGROUND

The present invention relates to fluids useful in subterranean operations. More specifically, the present invention relates to subterranean treatment fluids comprising one or more organic acids and methods of use in subterranean operations.

Treatment fluids may be used in a variety of subterranean treatments, including, but not limited to, stimulation treatments and sand control treatments. As used herein, the term "treatment," or "treating," refers to any subterranean operation that uses a fluid in conjunction with a desired function and/or for a desired purpose. The terms "treatment," and "treating," as used herein, do not imply any particular action by the fluid or any particular component thereof.

One common production stimulation operation that employs a treatment fluid is hydraulic fracturing. Hydraulic fracturing operations generally involve pumping a treatment fluid (e.g., a fracturing fluid) into a well bore that penetrates a subterranean formation at a sufficient hydraulic pressure to create or enhance one or more cracks, or "fractures," in the subterranean formation. "Enhancing" one or more fractures in a subterranean formation, as that term is used herein, is defined to include the extension or enlargement of one or more natural or previously created fractures in the subterranean formation. The treatment fluid may comprise particulates, often referred to as "proppant particulates," that are deposited in the fractures. The proppant particulates, inter alia, may prevent the fractures from fully closing upon the release of hydraulic pressure, forming conductive channels through which fluids may flow to the well bore. Once at least one fracture is created and the proppant particulates are substantially in place, the treatment fluid may be "broken" (i.e., the viscosity of the fluid is reduced), and the treatment fluid may be recovered from the formation.

Other common production stimulation operations that employ treatment fluids are acidizing operations. Where the subterranean formation comprises acid-soluble components, such as those present in carbonate and sandstone formations, stimulation is often achieved by contacting the formation with a treatment fluid that comprises an acid. For example, where hydrochloric acid contacts and reacts with calcium carbonate in a formation, the calcium carbonate is consumed to produce water, carbon dioxide, and calcium chloride. After acidization is completed, the water and salts dissolved therein may be recovered by producing them to the surface (e.g., "flowing back" the well), leaving a desirable amount of voids (e.g., wormholes) within the formation, which may enhance the formation's permeability and/or increase the rate at which hydrocarbons subsequently may be produced from the formation. One method of acidizing known as "fracture acidizing" comprises injecting a treatment fluid that comprises an acid into the formation at a pressure sufficient to create or enhance one or more fractures within the subterranean formation. Another method of acidizing known as "matrix acidizing" comprises injecting a treatment fluid that comprises an acid into the formation at a pressure below that which would create or enhance one or more fractures within the subterranean formation.

Treatment fluids are also utilized in sand control treatments, such as gravel packing. In "gravel-packing" treatments, a treatment fluid suspends particulates (commonly referred to as "gravel particulates"), and deposits at least a portion of those particulates in a desired area in a well bore, e.g., near unconsolidated or weakly consolidated formation zones, to form a "gravel pack," which is a grouping of particulates that are packed sufficiently close together so as to prevent the passage of certain materials through the gravel pack. This "gravel pack" may, inter alia, enhance sand control in the subterranean formation and/or prevent the flow of particulates from an unconsolidated portion of the subterranean formation (e.g., a propped fracture) into a well bore. One common type of gravel-packing operation involves placing a sand control screen in the well bore and packing the annulus between the screen and the well bore with the gravel particulates of a specific size designed to prevent the passage of formation sand. The gravel particulates act, inter alia, to prevent the formation sand from occluding the screen or migrating with the produced hydrocarbons, and the screen acts, inter alia, to prevent the particulates from entering the well bore. Once the gravel pack is substantially in place, the viscosity of the treatment fluid may be reduced to allow it to be recovered. In some situations, fracturing and gravel-packing treatments are combined into a single treatment (commonly referred to as "FRACPAC™" operations). In such FRACPAC™ operations, the treatments are generally completed with a gravel pack screen assembly in place with the hydraulic fracturing treatment being pumped through the annular space between the casing and screen. In this situation, the hydraulic fracturing treatment ends in a screen-out condition, creating an annular gravel pack between the screen and casing. In other cases, the fracturing treatment may be performed prior to installing the screen and placing a gravel pack.

Maintaining sufficient viscosity in the treatment fluids used in these operations is important for a number of reasons. Maintaining sufficient viscosity is important in fracturing and sand control treatments for particulate transport and/or to create or enhance fracture width. Also, maintaining sufficient viscosity may be important to control and/or reduce fluid loss into the formation. At the same time, while maintaining sufficient viscosity of the treatment fluid often is desirable, it may also be desirable to maintain the viscosity of the treatment fluid in such a way that the viscosity also may be reduced easily at a particular time, inter alia, for subsequent recovery of the fluid from the formation.

To provide the desired viscosity, polymeric gelling agents commonly are added to the treatment fluids. The term "gelling agent" is defined herein to include any substance that is capable of increasing the viscosity of a fluid, for example, by forming a gel. Examples of commonly used polymeric gelling agents include, but are not limited to, guar gums and derivatives thereof, cellulose derivatives, biopolymers, and the like. To further increase the viscosity of a treatment fluid, often the gelling agent is crosslinked with the use of a crosslinking agent. Conventional crosslinking agents may comprise a borate ion, a metal ion, or the like, and interact with at least two gelling agent molecules to form a crosslink between them, thereby forming a "crosslinked gelling agent." Treatment fluids comprising crosslinked gelling agents also may exhibit elastic or viscoelastic properties, wherein the crosslinks between gelling agent molecules may be broken and reformed, allowing the viscosity of the fluid to vary with certain conditions such as temperature, pH, and the like.

However, the use of conventional gelling agents may be problematic in certain subterranean formations exhibiting high temperatures (e.g., above about 200° F.). Many conventional gelling agents become unstable at these temperatures, which reduces the viscosity of the treatment fluid. This inability to maintain a desired level of viscosity at higher temperatures, among other problems, may increase fluid loss and decrease the ability of the fluid to suspend and/or transport particulate materials.

Inorganic acids and/or salts thereof have been added to subterranean treatment fluids used heretofore in the art for a variety of subterranean treatments, for example, in acidizing treatments. However, the use of inorganic acids may be problematic. For example, certain inorganic acids may corrode equipment placed in the subterranean formation. Certain inorganic acids also may thermally or hydrolytically degrade, or otherwise be incompatible with certain types of gelling agents (e.g., naturally-occurring polymers). To solve these problems in acidizing treatments, organic acids have been included in acidizing treatment fluids for their improved dissolving abilities and relatively low rates of corrosion at higher temperatures. Organic acid salts have been used in treatment fluids in a variety of subterranean operations, among other purposes, to improve the viscosity of the fluids. However, the use of organic acids has been limited heretofore to acidizing applications.

SUMMARY

The present invention relates to fluids useful in subterranean operations. More specifically, the present invention relates to subterranean treatment fluids comprising one or more organic acids and methods of use in subterranean operations.

In one embodiment, the present invention provides a method comprising: providing a treatment fluid that comprises an aqueous base fluid, a gelling agent, and one or more organic acids; and contacting a subterranean formation with the treatment fluid at or above a pressure sufficient to create or enhance one or more fractures in a portion of the subterranean formation.

In another embodiment, the present invention provides a method comprising: providing a treatment fluid that comprises an aqueous base fluid, a plurality of particulates, a gelling agent, and one or more organic acids; introducing the treatment fluid into at least a portion of a subterranean formation; and depositing at least a portion of the particulates in a portion of the subterranean formation so as to form a gravel pack in a portion of the subterranean formation.

In another embodiment, the present invention provides a method comprising: providing a treatment fluid that comprises an aqueous base fluid, a gelling agent, one or more organic acids or salts thereof, and one or more inorganic acids or salts thereof; and allowing at least a portion of the treatment fluid to react with at least a portion of a subterranean formation so that at least one void is formed in the subterranean formation.

In another embodiment, the present invention provides a method comprising: providing a treatment fluid that comprises an aqueous base fluid, a gelling agent, and one or more organic acids or salts thereof; introducing the treatment fluid into a subterranean formation; and allowing the treatment fluid to suspend one or more particulates in the subterranean formation.

The features and advantages of the present invention will be apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

Figure 1:
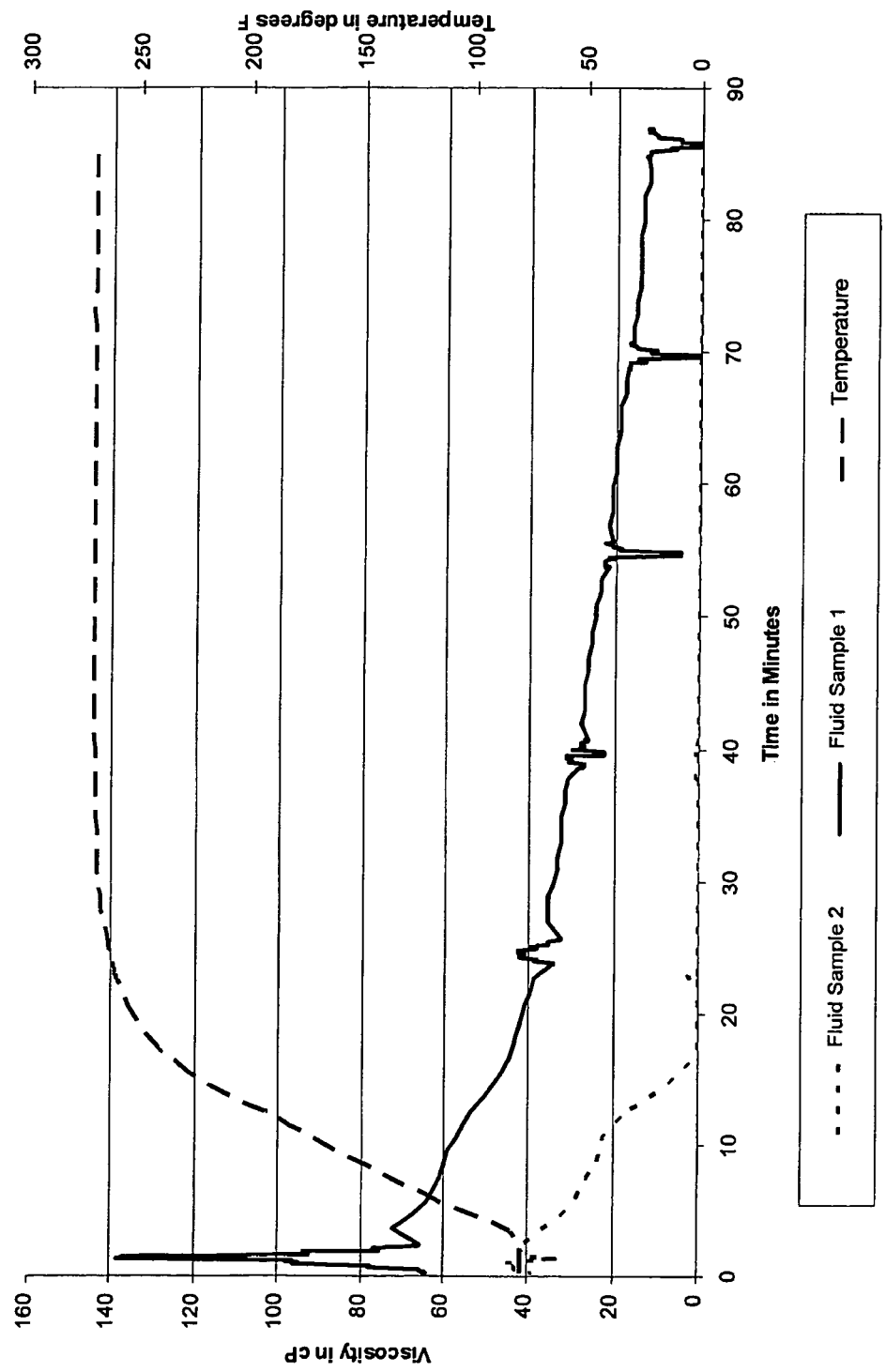
FIG. 1 illustrates some data regarding the viscosity of various treatment fluids, including certain embodiments of the treatment fluids of the present invention.

The present invention relates to fluids useful in subterranean operations. More specifically, the present invention relates to subterranean treatment fluids comprising one or more organic acids and methods of use in subterranean operations.

The present invention generally involves the use of treatment fluids that comprise an aqueous base fluid, a gelling agent, and one or more organic acids (and/or, in some embodiments, a salt thereof). The term "gelling agent" is defined herein to include any substance that is capable of increasing the viscosity of a fluid, for example, by forming a gel. The term "organic acid" is defined herein to include any acidic compound that comprises one or more carbon atoms. A "salt" of an organic acid, as that term is used herein, refers to any compound that shares the same base formula as a referenced organic acid, except that one of the hydrogen cations thereon is replaced by a different cation. The treatment fluids of the present invention are thought to, inter alia, maintain higher viscosities (e.g., above about 20 centipoises ("cP")) for longer periods of time and/or at higher temperatures than conventional treatment fluids, which may enable improved fluid loss prevention, particulate transport, hydraulic fracturing efficiency, and the like in subterranean operations employing these treatment fluids.

The aqueous base fluids used in the treatment fluids of the present invention may comprise fresh water, saltwater (e.g., water containing one or more salts dissolved therein), brine, seawater, or combinations thereof. Generally, the water may be from any source, provided that it does not contain components that might adversely affect the stability and/or performance of the treatment fluids of the present invention. In certain embodiments, the density of the aqueous base fluid can be adjusted, among other purposes, to provide additional particle transport and suspension in the treatment fluids of the present invention. In certain embodiments, the pH of the aqueous base fluid may be adjusted (e.g., by a buffer or other pH adjusting agent), among other purposes, to activate a crosslinking agent and/or to reduce the viscosity of the treatment fluid (e.g., activate a breaker, deactivate a crosslinking agent). In these embodiments, the pH may be adjusted to a specific level, which may depend on, among other factors, the types of gelling agents, acids, and other additives included in the treatment fluid. One of ordinary skill in the art, with the benefit of this disclosure, will recognize when such density and/or pH adjustments are appropriate.

The gelling agents used in the present invention may comprise any substance (e.g. a polymeric material) capable of increasing the viscosity of a fluid. In certain embodiments, the gelling agent may comprise polymers that have at least two molecules that are capable of forming a crosslink in a crosslinking reaction in the presence of a crosslinking agent, and/or polymers that have at least two molecules that are so crosslinked (i.e., a crosslinked gelling agent). The gelling agents may be naturally-occurring gelling agents, synthetic gelling agents, or a combination thereof. The gelling agents also may be cationic gelling agents, anionic gelling agents, or a combination thereof. In certain embodiments, suitable gelling agents may comprise polysaccharides, biopolymers, and/or derivatives thereof that contain one or more of these monosaccharide units: galactose, mannose, glucoside, glucose, xylose, arabinose, fructose, glucuronic acid, or pyranosyl sulfate. The term "derivative," as used herein, includes any compound that is made from one of the listed compounds, for example, by replacing one atom in the listed compound with another atom or group of atoms, rearranging two or more atoms in the listed compound, ionizing one of the listed compounds, or creating a salt of one of the listed compounds. Examples of suitable polysaccharides include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")), cellulose derivatives (e.g., hydroxyethyl cellulose, carboxyethylcellulose, carboxymethylcellulose, and carboxymethyl-hydroxyethylcellulose), xanthan, scleroglucan, diutan, and combinations thereof. In certain embodiments, the gelling agents comprise an organic carboxylated polymer, such as CMHPG.

Suitable synthetic polymers include, but are not limited to, 2,2'-azobis(2,4-dimethyl valeronitrile), 2,2'-azobis(2,4-dimethyl-4-methoxy valeronitrile), polymers and copolymers of acrylomide ethyltrimethyl ammonium chloride, acrylamide, acrylamido- and methacrylamido-alkyl trialkyl ammonium salts, acrylamidomethylpropane sulfonic acid, acrylamidopropyl trimethyl ammonium chloride, acrylic acid, dimethylaminoethyl methacrylamide, dimethylaminoethyl methacrylate, dimethylaminopropyl methacrylamide, dimethylaminopropylmethacrylamide, dimethyldiallylammonium chloride, dimethylethyl acrylate, fumaramide, methacrylamide, methacrylamidopropyl trimethyl ammonium chloride, methacrylamidopropyldimethyl-n-dodecylammonium chloride, methacrylamidopropyldimethyl-n-octylammonium chloride, methacrylamidopropyltrimethylammonium chloride, methacryloylalkyl trialkyl ammonium salts, methacryloylethyl trimethyl ammonium chloride, methacrylylamidopropyldimethylcetylammonium chloride, N-(3-sulfopropyl)-N-methacrylamidopropyl-N,N-dimethyl ammonium betaine, N,N-dimethylacrylamide, N-methylacrylamide, nonylphenoxypoly(ethyleneoxy)ethylmethacrylate, partially hydrolyzed polyacrylamide, poly 2-amino-2-methyl propane sulfonic acid, polyvinyl alcohol, sodium 2-acrylamido-2-methylpropane sulfonate, quaternized dimethylaminoethylacrylate, quaternized dimethylaminoethylmethacrylate, and mixtures and derivatives thereof. In certain embodiments, the gelling agent comprises an acrylamide/2-(methacryloyloxy)ethyltrimethylammonium methyl sulfate copolymer. In certain embodiments, the gelling agent may comprise an acrylamide/2-(methacryloyloxy)ethyltrimethylammonium chloride copolymer. In certain embodiments, the gelling agent may comprise a derivatized cellulose that comprises cellulose grafted with an allyl or a vinyl monomer, such as those disclosed in U.S. Pat. Nos. 4,982,793, 5,067,565, and 5,122,549, the relevant disclosures of which are incorporated herein by reference.

Additionally, polymers and copolymers that comprise one or more functional groups (e.g., hydroxyl, cis-hydroxyl, carboxylic acids, derivatives of carboxylic acids, sulfate, sulfonate, phosphate, phosphonate, amino, or amide groups) may be used as gelling agents.

The gelling agent may be present in the treatment fluids of the present invention in an amount sufficient to provide the desired viscosity. In some embodiments, the gelling agents (i.e., the polymeric material) may be present in an amount in the range of from about 0.1% to about 10% by weight of the treatment fluid. In certain embodiments, the gelling agents may be present in an amount in the range of from about 0.15% to about 2.5% by weight of the treatment fluid.

In those embodiments of the present invention where it is desirable to crosslink the gelling agent, the treatment fluid may comprise one or more of the crosslinking agents. The crosslinking agents may comprise a borate, a metal ion, or similar component that is capable of crosslinking at least two molecules of the gelling agent. Examples of suitable crosslinking agents include, but are not limited to, borate ions, magnesium ions, zirconium IV ions, titanium IV ions, aluminum ions, antimony ions, chromium ions, iron ions, copper ions, magnesium ions, and zinc ions. These ions may be provided by providing any compound that is capable of producing one or more of these ions. Examples of such compounds include, but are not limited to, ferric chloride, boric acid, disodium octaborate tetrahydrate, sodium diborate, pentaborates, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, and titanium acetylacetonate, aluminum lactate, aluminum citrate, antimony compounds, chromium compounds, iron compounds, copper compounds, zinc compounds, and combinations thereof. In certain embodiments of the present invention, the crosslinking agent may be formulated to remain inactive until it is "activated" by, among other things, certain conditions in the fluid (e.g., pH, temperature, etc.) and/or interaction with some other substance. In some embodiments, the crosslinking agent may be delayed by encapsulation with a coating (e.g., a porous coating through which the crosslinking agent may diffuse slowly, or a degradable coating that degrades downhole) that delays the release of the crosslinking agent until a desired time or place. The choice of a particular crosslinking agent will be governed by several considerations that will be recognized by one skilled in the art, including but not limited to the following: the type of gelling agent included, the molecular weight of the gelling agent(s), the conditions in the subterranean formation being treated, the safety handling requirements, the pH of the treatment fluid, temperature, and/or the desired delay for the crosslinking agent to crosslink the gelling agent molecules.

When included, suitable crosslinking agents may be present in the treatment fluids of the present invention in an amount sufficient to provide, inter alia, the desired degree of crosslinking between molecules of the gelling agent. In certain embodiments, the crosslinking agent may be present in the treatment fluids of the present invention in an amount in the range of from about 0.0005% to about 1% by weight of the treatment fluid. In certain embodiments, the crosslinking agent may be present in the treatment fluids of the present invention in an amount in the range of from about 0.005% to about 1% by weight of the treatment fluid. One of ordinary skill in the art, with the benefit of this disclosure, will recognize the appropriate amount of crosslinking agent to include in a treatment fluid of the present invention based on, among other things, the temperature conditions of a particular application, the type of gelling agents used, the molecular weight of the gelling agents, the desired degree of viscosification, and/or the pH of the treatment fluid.

The organic acids used in the present invention may comprise any acidic compound that comprises one or more carbon atoms. Examples of suitable organic acids include, but are not limited to, formic acid, acetic acid, citric acid, glycolic acid, lactic acid, and 3-hydroxypropionic acid. Alternatively or in combination with one or more organic acids, the treatment fluids of the present invention may comprise a salt of an organic acid. A "salt" of an acid, as that term is used herein, refers to any compound that shares the same base formula as the referenced acid, but one of the hydrogen cations thereon is replaced by a different cation (e.g., an antimony, bismuth, potassium, sodium, calcium, magnesium, cesium, or zinc cation). Examples of suitable salts of organic acids include, but are not limited to, sodium acetate, sodium formate, calcium acetate, calcium formate, cesium acetate, cesium formate, potassium acetate, potassium formate, magnesium acetate, magnesium formate, zinc acetate, zinc formate, antimony acetate, antimony formate, bismuth acetate, and bismuth formate. The treatment fluids of the present invention may comprise any combination of organic acids and/or salts thereof. The one or more organic acids (or salts thereof) may be present in the treatment fluids of the present invention in an amount sufficient to provide the desired viscosity. In some embodiments, the one or more organic acids (or salts thereof) may be present in an amount in the range of from about 0.001% by weight of the treatment fluid to the saturation level of the treatment fluid. In certain embodiments, the one or more organic acids (or salts thereof) may be present in an amount in the range of from about 1% by weight of the treatment fluid to the saturation level of the treatment fluid. The amount of the organic acid(s) (or salts thereof) included in a particular treatment fluid of the present invention may depend upon the particular acid and/or salt used, as well as other components of the treatment fluid, and/or other factors that will be recognized by one of ordinary skill in the art.

In certain embodiments, the treatment fluids of the present invention optionally may comprise one or more inorganic acids (or salts thereof, as that term is defined above). The term "inorganic acid" refers to any acidic compound that does not comprise a carbon atom. Examples of suitable inorganic acids include, but are not limited to, hydrochloric acid, hydrofluoric acid, hydrobromic acid, sulfuric acid, phosphoric acid, and nitric acid. Examples of suitable salts of inorganic acids include, but are not limited to, sodium chloride, calcium chloride, potassium chloride, sodium bromide, calcium bromide, potassium bromide, sodium sulfate, calcium sulfate, sodium phosphate, calcium phosphate, sodium nitrate, calcium nitrate, cesium chloride, cesium sulfate, cesium phosphate, cesium nitrate, cesium bromide, potassium sulfate, potassium phosphate, potassium nitrate, and the like. When included, the treatment fluids of the present invention may comprise any combination of inorganic acids and/or salts thereof. The one or more inorganic acids (or salts thereof) may be present in the treatment fluids of the present invention in an amount sufficient to provide the desired viscosity. In some embodiments, the one or more inorganic acids (or salts thereof) may be present in an amount in the range of from about 1% by weight of the treatment fluid to the saturation level of the treatment fluid, which may depend upon the particular acid and/or salt used, as well as other components of the treatment fluid.

The treatment fluids of the present invention optionally may comprise particulates, such as proppant particulates or gravel particulates. Particulates suitable for use in the present invention may comprise any material suitable for use in subterranean operations. Suitable materials for these particulates include, but are not limited to, sand, bauxite, ceramic materials, glass materials, polymer materials, TEFLON® (polytetrafluoroethylene) materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. The mean particulate size generally may range from about 2 mesh to about 400 mesh on the U.S. Sieve Series; however, in certain circumstances, other mean particulate sizes may be desired and will be entirely suitable for practice of the present invention. In particular embodiments, preferred mean particulates size distribution ranges are one or more of 6/12, 8/16, 12/20, 16/30, 20/40, 30/50, 40/60, 40/70, or 50/70 mesh. It should be understood that the term "particulate," as used in this disclosure, includes all known shapes of materials, including substantially spherical materials, fibrous materials, polygonal materials (such as cubic materials), and mixtures thereof. Moreover, fibrous materials, that may or may not be used to bear the pressure of a closed fracture, may be included in certain embodiments of the present invention. In certain embodiments, the particulates included in the treatment fluids of the present invention may be coated with any suitable resin or tackifying agent known to those of ordinary skill in the art. In certain embodiments, the particulates may be present in the treatment fluids of the present invention in an amount in the range of from about 0.5 pounds per gallon ("ppg") to about 30 ppg by volume of the treatment fluid.

The treatment fluids of the present invention also may include internal gel breakers such as enzyme, oxidizing, acid buffer, or delayed gel breakers. The gel breakers may cause the treatment fluids of the present invention to revert to thin fluids that can be produced back to the surface, for example, after they have been used to place proppant particles in subterranean fractures. In some embodiments, the gel breaker may be formulated to remain inactive until it is "activated" by, among other things, certain conditions in the fluid (e.g. pH, temperature, etc.) and/or interaction with some other substance. In some embodiments, the gel breaker may be delayed by encapsulation with a coating (e.g. a porous coatings through which the breaker may diffuse slowly, or a degradable coating that degrades downhole.) That delays the release of the gel breaker. In certain embodiments, the gel breaker used may be present in the treatment fluid in an amount in the range of from about 0.0001% to about 200% by weight of the gelling agent. One of ordinary skill in the art, with the benefit of this disclosure, will recognize the type and amount of a gel breaker to include in certain treatment fluids of the present invention based on, among other factors, the desired amount of delay time before the gel breaks, the type of gelling agents used, the temperature conditions of a particular application, the desired rate and degree of viscosity reduction, and/or the pH of the treatment fluid.

The treatment fluids of the present invention optionally may include one or more of a variety of well-known additives, such as gel stabilizers, fluid loss control additives, scale inhibitors, corrosion inhibitors, catalysts, clay stabilizers, biocides, bactericides, friction reducers, gases, foaming agents, surfactants, iron control agents, solubilizers, pH adjusting agents (e.g., buffers), and the like. For example, in some embodiments, it may be desired to foam a treatment fluid of the present invention using a gas, such as air, nitrogen, or carbon dioxide. Those of ordinary skill in the art, with the benefit of this disclosure, will be able to determine the appropriate additives for a particular application.

The treatment fluids of the present invention may be prepared by any method suitable for a given application. For example, certain components of the treatment fluid of the present invention (e.g., crosslinkable polymers, biopolymers, etc.) may be provided in a pre-blended powder, which may be combined with the aqueous base fluid at a subsequent time. In preparing the treatment fluids of the present invention, the pH of the aqueous base fluid may be adjusted, among other purposes, to facilitate the hydration of the gelling agent. The pH range in which the gelling agent will readily hydrate may depend upon a variety of factors (e.g., the components of the gelling agent, etc.) that will be recognized by one skilled in the art. This adjustment of pH may occur prior to, during, or subsequent to the addition of the gelling agent and/or other components of the treatment fluids of the present invention. For example, the treatment fluids of the present invention may comprise an ester that releases an acid once placed downhole that is capable of, inter alia, reducing the pH and/or viscosity of the treatment fluid. After the pre-blended powders and the aqueous base fluid have been combined, crosslinking agents and/or other suitable additives may be added prior to introduction into the well bore. Those of ordinary skill in the art, with the benefit of this disclosure will be able to determine other suitable methods for the preparation of the treatments fluids of the present invention.

The treatment fluids of the present invention may be used in any subterranean operation wherein a fluid may be used. Suitable subterranean operations may include, but are not limited to, drilling operations, hydraulic fracturing treatments, sand control treatments (e.g., gravel packing), acidizing treatments (e.g., matrix acidizing or fracture acidizing), "frac-pack" treatments, well bore clean-out treatments, and other suitable operations where a treatment fluid of the present invention may be useful.

In certain embodiments, the methods of the present invention comprise: providing a treatment fluid that comprises an aqueous base fluid, a gelling agent, and one or more organic acids; and contacting a subterranean formation with the treatment fluid at or above a pressure sufficient to create or enhance one or more fractures in a portion of the subterranean formation. In these embodiments, a treatment fluid of the present invention may be pumped into a well bore that penetrates a subterranean formation at a sufficient hydraulic pressure to create or enhance one or more cracks, or "fractures," in the subterranean formation. "Enhancing" one or more fractures in a subterranean formation, as that term is used herein, is defined to include the extension or enlargement of one or more natural or previously created fractures in the subterranean formation. The treatment fluids of the present invention used in these embodiments optionally may comprise particulates, often referred to as "proppant particulates," that may be deposited in the fractures. The proppant particulates may function, inter alia, to prevent one or more of the fractures from fully closing upon the release of hydraulic pressure, forming conductive channels through which fluids may flow to the well bore. Once at least one fracture is created and the proppant particulates are substantially in place, the viscosity of the treatment fluid of the present invention may be reduced (e.g., through the use of a gel breaker, or allowed to reduce naturally over time) to allow it to be recovered.

In certain embodiments, the methods of the present invention comprise: providing a treatment fluid that comprises an aqueous base fluid, a plurality of particulates, a gelling agent, and one or more organic acids; introducing the treatment fluid into at least a portion of a subterranean formation; and depositing at least a portion of the particulates in a portion of the subterranean formation so as to form a gravel pack in a portion of the subterranean formation. In these embodiments, a treatment fluid of the present invention may suspend the plurality of particulates (commonly referred to as "gravel particulates"), and deposit at least a portion of those particulates in a desired area in a subterranean formation, for example, in a portion of a well bore near an unconsolidated or weakly consolidated area in the formation, to form a "gravel pack," which is a grouping of particulates that are packed sufficiently close together so as to prevent the passage of certain materials through the gravel pack. This "gravel pack" may, inter alia, enhance sand control in the subterranean formation and/or prevent the flow of particulates from an unconsolidated portion of the subterranean formation (e.g., a propped fracture) into a well bore. In certain embodiments, a sand control screen may be placed in a portion of a well bore penetrating the subterranean formation, and the annulus between the screen and the well bore may become packed with particulates. These particulates may have a specific size designed to prevent the passage of formation sand and/or other materials in the formation. The particulates may act, inter alia, to prevent the formation particulates from occluding the screen or migrating with the produced hydrocarbons, and the screen may act, inter alia, to prevent the particulates from entering the well bore. Once the particulates are near or deposited in the desired portion of the subterranean formation, the viscosity of the treatment fluid of the present invention may be reduced (e.g., through the use of a gel breaker, or allowed to reduce naturally over time) to allow it to be recovered.

In certain embodiments, the methods of the present invention comprise: providing a treatment fluid that comprises an aqueous base fluid, a gelling agent, one or more organic acids or salts thereof, and one or more inorganic acids or salts thereof; and allowing at least a portion of the treatment fluid to react with at least a portion of a subterranean formation so that at least one void is formed in the subterranean formation. In these embodiments, a portion of the subterranean formation is contacted with a treatment fluid of the present invention comprising one or more organic acids (or salts thereof) and one or more inorganic acids (or salts thereof), which interact with subterranean formation to form "voids" (e.g., cracks, fractures, wormholes, etc.) in the formation. After acidization is completed, the treatment fluid of the present invention (or some portion thereof) may be recovered to the surface. The remaining voids in the subterranean formation may, inter alia, enhance the formation's permeability, and/or increase the rate at which fluids subsequently may be produced from the formation. In certain embodiments, a treatment fluid of the present invention may be introduced into the subterranean formation at or above a pressure sufficient to create or enhance one or more fractures within the subterranean formation. In other embodiments, a treatment fluid of the present invention may be introduced into the subterranean formation below a pressure sufficient to create or enhance one or more fractures within the subterranean formation.

In certain embodiments, the methods of the present invention comprise: providing a treatment fluid comprising an aqueous base fluid, a gelling agent, and one or more organic acids; introducing the treatment fluid into a subterranean formation; and allowing the treatment fluid to suspend one or more particulates in the subterranean formation. In these embodiments, the treatment fluid may be used in any subterranean operation where it is desirable to suspend one or more particulates (e.g., proppant particulates, formation fines, gravel particulates, etc.) in the fluid. In certain embodiments, the treatment fluid may be used in clean-out operations, wherein the treatment fluid may be circulated in the subterranean formation, thereby suspending particulates residing in the formation in the treatment fluid. The treatment fluid then may be recovered out of the formation, carrying the suspended particulates with it. In certain embodiments, the treatment fluid may be introduced into and/or circulated in a subterranean formation in the course of drilling a portion of a well bore in a subterranean formation, wherein the treatment fluid may suspend particulate cuttings generated from the drilling process. In certain embodiments, once the treatment fluid has been allowed to suspend one or more particulates in the subterranean formation, the treatment fluid may be recovered (e.g., by "flowing back" the well) from the formation.

To facilitate a better understanding of the present invention, the following examples of certain aspects of some embodiments are given. In no way should the following examples be read to limit or define the scope of the invention.

EXAMPLES

Example 1

Samples of two artificially-spent acid treatment fluids having the following compositions were prepared in a Waring blender: Fluid Sample 1 contained 196 mL of an aqueous solution composed of 0.2% by volume formic acid and 0.4% by volume hydrochloric acid to which was added 4 mL of an acrylamide/2-(methacryloyloxy)ethyltrimethylammonium methyl sulfate copolymer gelling agent. Fluid Sample 2 contained 196 mL of an aqueous solution composed of 2% by volume hydrochloric acid to which was added 4 mL of an acrylamide/2-(methacryloyloxy)ethyltrimethylammonium methyl sulfate copolymer gelling agent. The pH of each sample was then adjusted to ~pH 3 with a 40% by weight potassium carbonate buffer solution. The viscosity of each sample were observed and recorded using a FANN® Model 50 viscometer (a viscometer available from Fann Instrument Company, Houston, Tex.) with a Hastalloy B5X bob and standard sleeve using a No. 1 spring. The Model 50 viscometer test procedure that followed was a modified API2 program that consisted of 118/29/88 rpm ramping scan with 88 rpm as the base. When the sample reached the target temperature, it performed its first ramping scan. Thereafter, ramping scans occurred every 10 to 15 minutes. Each ramping scan provided shears at 118 rpm (1000, 88 rpm (75 s$^{-1}$), 59 rpm (50 s$^{-1}$), and 29 rpm (25 s$^{-1}$), then back to 59, 88, and 118 rpm before settling to 88 rpm. At the end of the test, the data was collected and the time averaged. A plot of time (min) versus viscosity (cP) and temperature (° F.) for each sample is provided in FIG. 1.

Thus, Example 1 illustrates that the treatment fluids of the present invention may maintain higher viscosities at higher temperatures and/or for longer periods of time than conventional treatment fluids.

Example 2

Figure 2:
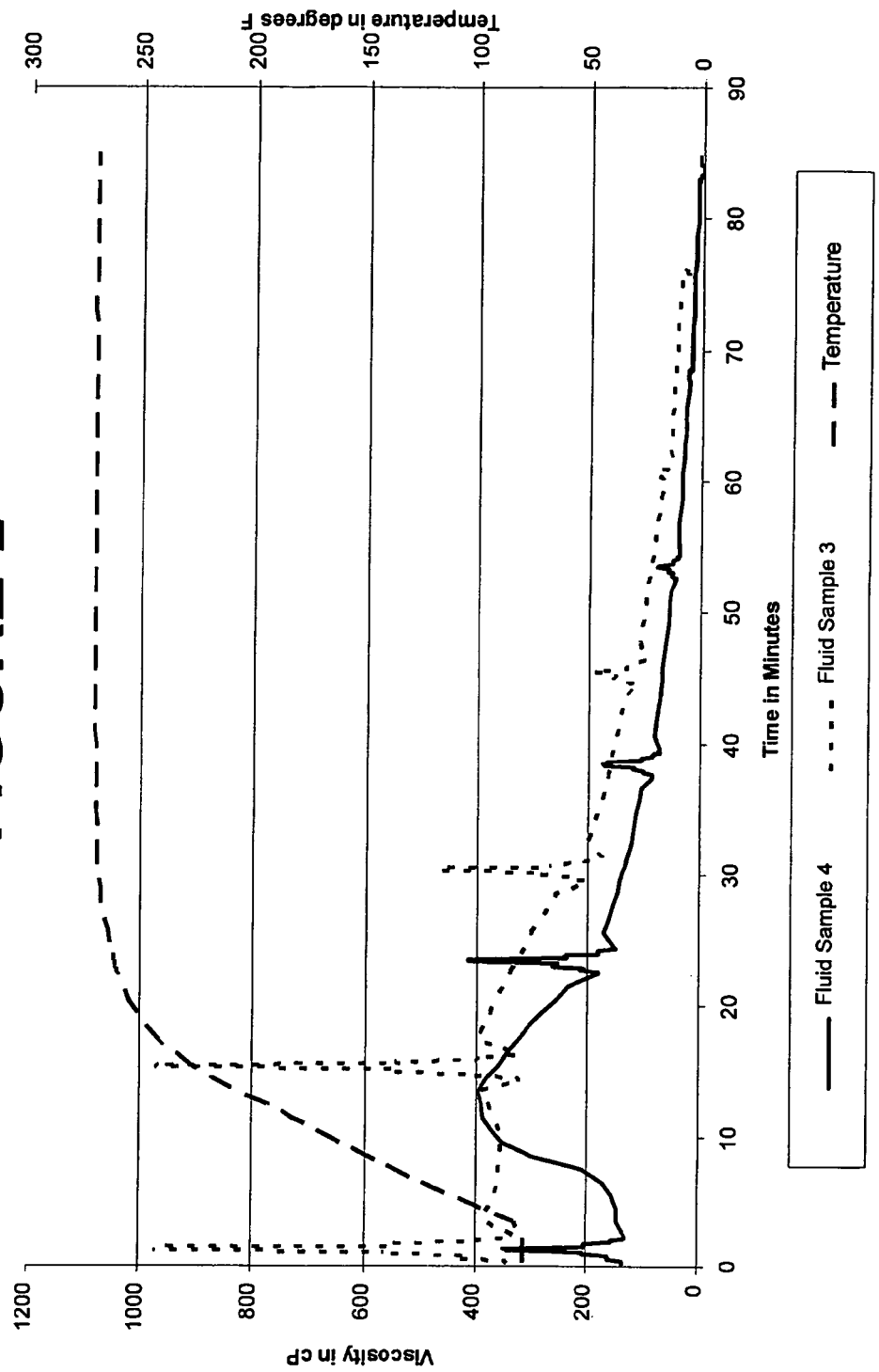
FIG. 2 illustrates some data regarding the viscosity of various treatment fluids, including certain embodiments of the treatment fluids of the present invention.

Samples of two artificially-spent acid treatment fluids' having the following compositions were prepared in a Waring blender: Fluid Sample 3 contained 194.7 mL of an aqueous solution composed of 0.2% by volume formic acid and 0.4% by volume hydrochloric acid to which was added 4 mL of an acrylamide/2-(methacryloyloxy)ethyltrimethylammonium methyl sulfate copolymer gelling agent, 0.4 mL of a glycolic acid buffer, and 0.9 mL of a crosslinking agent solution (aqueous solution of 60% by weight ferric chloride). Fluid Sample 4 contained 194.7 mL of an aqueous solution composed of 2% by volume hydrochloric acid to which was added 4 mL of an acrylamide/2-(methacryloyloxy)ethyltrimethylammonium methyl sulfate copolymer gelling agent, 0.4 mL of a glycolic acid buffer, and 0.9 mL of a crosslinking agent solution (aqueous solution of 40% by weight ferric chloride). 0.096 grams of a ferric iron inhibitor (FERCHEK®, available from Halliburton Energy Services, Duncan, Okla.) was then added to each fluid sample. The pH of each sample was then adjusted to ~pH 3 with a 40% by weight potassium carbonate buffer solution. The viscosity of each sample were observed and recorded using a FANN® Model 50 viscometer with a Hastalloy 35X bob and standard sleeve using a No. 1 spring. The Model 50 viscometer test procedure that followed was a modified API2 program that consisted of 118/29/88 rpm ramping scan with 88 rpm as the base. When the sample reached the target temperature, it performed its first ramping scan. Thereafter, ramping scans occurred every 10 to 15 minutes. Each ramping scan provided shears at 118 rpm (100 s$^{-1}$), 88 rpm (75 s$^{-1}$), 59 rpm (50 s$^{-1}$), and 29 rpm (25 s$^{-1}$), then back to 59, 88, and 118 rpm before settling to 88 rpm. At the end of the test, the data was collected and the time averaged. A plot of time (min) versus viscosity (cP) and temperature (° F.) for each sample is provided in FIG. 2.

Thus, Example 2 illustrates that the treatment fluids of the present invention may maintain higher viscosities at higher temperatures and/or for longer periods of time than conventional treatment fluids.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. While numerous changes may be made by those skilled in the art, such changes are encompassed within the spirit of this invention as defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:
1. A method comprising:
providing a treatment fluid that comprises:
an aqueous base fluid,
a acrylamide/2-(methacryloyloxy)ethyltrimethylammonium methyl sulfate copolymer gelling agent,
a crosslinking agent selected from the group consisting of a borate, a metal ion, and any combination thereof,
formic acid or a salt thereof, and
hydrochloric acid or a salt thereof;

introducing the treatment fluid into at least a portion of a subterranean formation having a temperature of above about 275° F.;

forming at least one void in the subterranean formation with the treatment fluid, wherein the viscosity of the treatment fluid in the subterranean formation is greater than about 20 cP for at least 20 minutes at temperatures higher than about 275° F.

2. The method of claim 1, wherein the metal ion is selected from the group consisting of a magnesium ion, a zirconium IV ion, a titanium IV ion, an aluminum ion, an antimony ion, a chromium ion, an iron ion, a copper ion, and a zinc ion.

3. The method of claim 1, wherein the crosslinking agent is present in an amount from about 0.0005% to about 1% by weight of the treatment fluid.

4. The method of claim 1, wherein the acrylamide/2-(methacryloyloxy)ethyltrimethylammonium methyl sulfate copolymer gelling agent is present in an amount from about 0.1% to about 10% by weight of the treatment fluid.

5. The method of claim 1, wherein introducing the treatment fluid occurs at or above a pressure sufficient to create or extend at least one or more fractures in the portion of the subterranean formation.

6. The method of claim 1, wherein introducing the treatment fluid occurs below a pressure sufficient to create or extend at least one or more fractures in the portion of the subterranean formation.

7. The method of claim 1 further comprising:
recovering at least a portion of the treatment fluid.

* * * * *